April 24, 1962 E. R. OLSEN 3,031,240
PISTON AND RING ASSEMBLY
Filed July 10, 1958
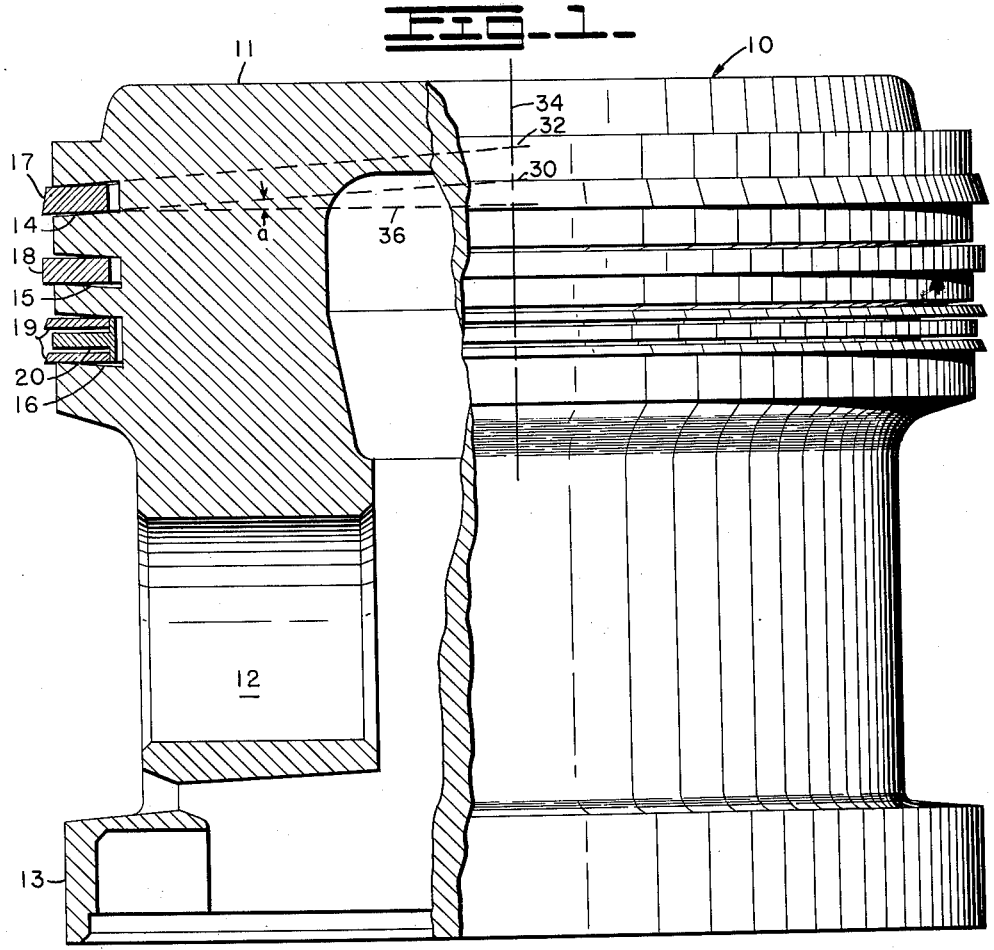
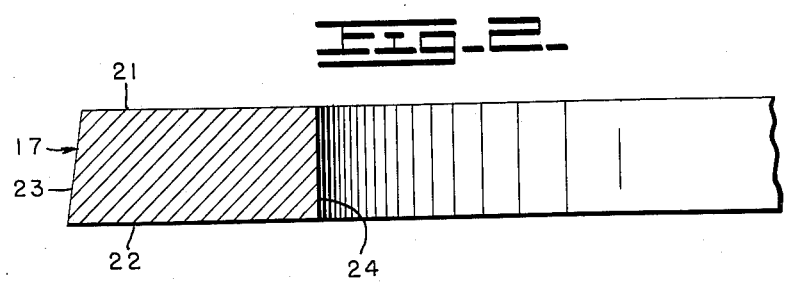
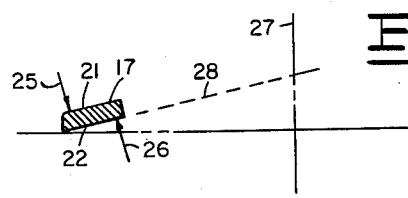
INVENTOR:
ERNEST R. OLSEN
BY United States Patent Office 3,031,240
Patented Apr. 24, 1962

3,031,240
PISTON AND RING ASSEMBLY
Ernest R. Olsen, 2241 Jefferson St., Muskegon
Heights, Mich.
Filed July 10, 1958, Ser. No. 747,607
5 Claims. (Cl. 309—7)

This invention relates to pistons and piston rings of the type used in internal combustion engines. The difference in diameter between a piston and the cylinder in which it operates necessitates the use of some type of a sealing arrangement if any substantial amount of compression is to be developed, and if excessive movement of oil from the crankcase into the cylinder is to be prevented. It is conventional practice to provide a group of peripheral grooves on the piston, and to install resilient rings in these grooves which are in the approximate form of an interrupted circle. It is the intention that these rings should bear directly against the cylinder wall, and should affect a seal against the sides of the groove in which the ring is positioned.

The inevitable difference between the width of the ring groove and the thickness of the ring creates a problem which has proven to be extremely difficult to solve. At least a few thousandths of an inch of clearance is required between the ring and the groove in order to permit the ring to move and position itself radially under its own resiliency. As the combined effect of inertia and gas pressure urges a ring against one particular wall of the groove, it is obvious that gas pressure or oil can find its way in the clearance area between the ring and the opposite side of the groove. The periodic nature of both the inertia and the gas pressure forces is such that conventional ring installations exhibit a tendency to move back and forth in a periodic relationship in the groove. This movement causes a corresponding series of periods in which the ring permits the passage of oil or gas pressure around it. It is generally recognized that oil will tend to move around underneath and in back of a ring, and gradually work its way into the upper area of the cylinder where it is carbonized by the combustion heat.

One of the methods of controlling the tendency for the ring to dislodge itself from continuous engagement with the walls of the ring groove has been to machine the ring in such a fashion that it exhibits a tendency to rotate itself into a generally conical configuration by moving each cross sectional element around a tangential axis so that a ring which had initially flat sides tends to deform these sides into the surface of a cone. The net effect of this distortion is to establish ring contact on both sides of the ring groove with a resilient pressure, preferably sufficient to overcome the tendency of gas pressure and inertia to oscillate the ring from one side of the groove to the other. This pressure should not be sufficient, however, to cause the ring to bind in the groove and thereby limit its ability to securely engage the cylinder wall. The manner of machining the ring to cause the torsional deflection has been to alter the cross sectional configuration so that the neutral axis of the ring in bending is inclined with respect to a radius to the axis of the cylinder wall. This arrangement results in a tendency toward instability of the ring material, and causes a ring which is generally rectangular in cross section to rotate itself in a direction to bring the neutral axis toward parallelism with the cylinder axis. This phenomenon is similar to the well known behavior of a long thin strip when a bending moment is applied in a position to cause it to deflect against its width rather than its thickness. The instant the direction of the applied bending moment deviates from a plane parallel to the sides of the strip, the strip will tend to snap approximately ninety degrees so that its thickness dimension rather than its width determines the resistance to bending. The effect of machining the ring has a tendency to distort the relationship between the plane of the applied bending moment and the neutral axis in bending of the ring so as to cause the behavior referred to above. When a ring is machined to induce a rotation such as to cause the outer upper and inner lower portions of the ring to engage the groove, the effect is referred to as "torsional" deflection of the ring. It has come to be common practice to refer to the opposite effect as "reverse torsion." This latter causes the outer lower and inner upper portions of the ring to engage the groove, and this effect is covered in my application for patent Serial Number 658,040 filed on May 9, 1957.

The problems in machining the rings with economy and uniformity to induce either the torsion or reverse torsion effects have been extensive. To begin with, the machining operation itself is inevitably subject to some variations. Lack of uniformity in hardness of the ring material has also created a problem, particularly when the machining operations tend to release certain fibre stresses within the material induced either by heating procedures or surface cold-working. Applicant has recognized very clearly that it is undesirable to rely on the machining of the ring to establish the displacement tendency of the ring within the groove to effect a seal on both upper and lower groove walls. Any cast iron ring is heir to enough variables encountered in the casting methods employed, through differences in degree of hardness caused by rate of cooling of the various portions of the ring, without imposing upon the ring any unnecessary strains and distortions due to the machining operations. It would be much simpler and more reliable to machine the rings in a form such that the sides were disposed in flat planes, and provide much less attention to the formation of the inner edge than is possible when the machining operations are used to control the deflection tendencies. Applicant has found that the positioning of the ring within the groove can be more effectively controlled by utilizing flat and simple-cross section rings in engagement with grooves in which the walls are disposed in a conical configuration with respect to the axis of the piston. When the rings are inserted in these grooves, the rings exhibit a natural tendency to engage the opposite faces of the groove as the rings are forced into position. The net effect as far as sealing the groove is concerned is identical to that of the distorted-section ring, but the uniformity and economy of utilizing the groove formation rather than that of the ring to obtain this effect provides a vast improvement. The preferred form of the invention is illustrated in the accompanying drawing, and in the drawing:

FIGURE 1 presents a view in elevation, partially in section, of a piston and ring assembly embodying the invention.

FIGURE 2 is a view on an enlarged scale of the cross section of a ring of the type shown in the top groove of the piston shown in FIGURE 1.

FIGURE 3 is a diagram illustrating with exaggeration the forces acting on the piston ring to create the torsional deflection.

Referring to the drawing, the piston indicated generally at 10 has an upper surface 11 against which the compression and explosion pressures are exerted. The piston is also provided with a conventional bearing system as indicated at 12 on opposite sides for receiving a pin connecting the piston to the connecting rod. The skirt portion 13 of the piston stabilizes the axis of the piston with respect to the axis of the cylinder. Peripheral grooves 14, 15, and 16 are provided for receiving the ring means 17, 18, and 19. The ring elements 19 are separated and urged outwardly by the expander 20.

The walls of the groove 14 are inclined to form conical surfaces coaxial with the piston axis, and with the apices of these surfaces at a point somewhat above the groove surfaces, with the piston in the position shown in the drawing. Proceeding from the axis of the piston outwardly, this gives the effect of a downward slope to the walls of the groove 14. An opposite inclination is applied to the grooves 15 and 16. The insertion of the ring 17, which was initially flat in the sense that the side walls 21 and 22 are disposed in flat planes, causes the cross section of the ring to rotate as it is confined by the ring groove, and thereby establishes a tendency for the ring to bear at the outer upper and inner lower portions and effect a seal within the groove against the passage of the combustion gasses. The presence of a firm engagement at the inner lower edge tends to prevent the ring from being unseated by inertia forces, and thereby prevents blow-by by maintaining gas pressure back of the ring for prevention of ring collapse. The engagement of the lower rings 18 and 19 at the outer lower edges of the respective grooves tends to prevent oil from moving it underneath the ring, and around behind it. These effects are provided by the slanted-groove system with greater peripheral uniformity than is obtainable by the use of unstable ring cross-sections. The instability is a function of local bending moment with decreases to zero at the ring gap, with corresponding lack of sealing at this area.

The twisting effect imposed on the ring by the conical orientation of the groove will establish the necessary relationship between the ring and the groove regardless of the variations in the formation of the ring itself. It is common practice to machine the outer edges of the rings with a slight bevel to establish a line contact with the cylinder wall, and this itself has a tendency to alter the position of the neutral axis of the cross section of the ring. Variations in formation of the inner edge will have a similar effect, and the amount of incline of the groove can be selected to establish a compromise which will properly position the average ring dimensions. With this arrangement, it is also possible to machine the outer edges or inner edges for whatever other considerations may be necessary without sacrificing the ring behavior within the groove. For example, the cross section of the ring element 17, as a result of the configuration established between the upper and lower surfaces 21 and 22 and the outer and inner edges 23 and 24, respectively, would normally exhibit a tendency to rotate in the same direction as the inclination of the groove 14 because of the section change caused by the outer bevelled surface 23. This would normally tend to destroy the very sealing effect that is desired, except for the fact that the amount of inclination of the groove may be selected to accommodate this tendency and still retain the sealing characteristics.

The walls of the groove 17 have been extended by construction lines 30 and 32 in FIG. 1, to intersect the piston axis 34, in order to illustrate the angle $a$ formed between the walls and a radius 36 perpendicular to the axis 34. The forces applied to the piston ring by the groove walls at each point around the ring periphery are diagrammatically illustrated in FIG. 3. The ring is initially manufactured in the configuration shown in FIG. 2, with the surfaces 21 and 22 in planes perpendicular to the ring axis. The inclination of the walls of the groove 14, as indicated by the angle $a$ in FIG. 1, has the effect of applying forces as shown at 25 and 26 to create a torsion moment causing the ring to deflect to the illustrated position when it is engaged in the groove. The surfaces 21 and 22 then become conical about the ring-cylinder axis 27, the dotted line 28 being a projected trace of the conical surface 22.

Ordinarily, around two thousandths of an inch clearance is present between the ring and the side walls of the groove. This dimension, however, becomes variable under the standard production tolerances. The inclination of the groove should be sufficient to bring the ring into contact with the opposite groove faces with enough resilient force to establish the necessary sealing characteristics, which result from preventing ring movement from one groove face to the other. The amount of this inclination is extremely small (being approximately forty minutes and fifteen seconds of angle), sufficiently so to present but a minor problem in the manufacture of the piston. The precise amount of inclination of the grooves is subject to the particular engine characteristics with regard to the piston accelerations involved and also the combustion and compression pressures. As an upper limit to the amount of inclination of the groove, the ring should not be so heavily distorted as to lock itself in position in the groove against radial deflection to accommodate itself to the cylinder wall.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A piston and ring assembly, comprising: a piston having a plurality of peripheral grooves, said grooves having the walls thereof disposed on substantially conical parallel surfaces coaxial with said piston the uppermost of said grooves having the apices of the said surfaces thereof above the said grooves, respectively, and certain of said grooves having the apices of the said surfaces below the said grooves, respectively; and ring means having substantially radially disposed top and bottom surfaces in the unrestrained state, and having a conical surface on the periphery thereof causing the said ring means to present the major diameter at the bottom thereof received in each of said grooves, said ring means being resiliently distorted by said grooves in a manner to rotate portions of said ring about tangential axes at said portions.

2. A piston and ring assembly, comprising: a piston having a plurality of peripheral grooves, said grooves having the walls thereof disposed on substantially conical parallel surfaces coaxial with said piston the uppermost of said grooves having the apices of the said surfaces thereof above the said grooves, respectively, and certain of said grooves having the apices of the said surfaces below the said grooves, respectively; and ring means having substantially radially disposed top and bottom surfaces in the unrestrained state received in each of said grooves, said ring means being resiliently distorted by said grooves in a manner to rotate portions of said ring about tangential axes at said portions.

3. A piston and ring assembly, comprising: a piston having a plurality of peripheral grooves, said grooves having the walls thereof disposed on substantially conical parallel surfaces coaxial with said piston certain of said grooves having the apices of the said surfaces thereof above the said grooves, respectively, and certain of said grooves having the apices of the said surfaces below the said grooves, respectively; and ring means received in each of said grooves, said ring means being resiliently distorted by said grooves in a manner to rotate portions of said ring about tangential axes at said portions.

4. A piston and ring assembly, comprising: a piston having at least one peripheral groove, said groove having the walls thereof disposed on substantially conical parallel surfaces coaxial with said piston; and ring means having substantially radially disposed top and bottom surfaces in the unrestrained state received in said groove, said ring means being resiliently distorted by said groove in a manner to rotate portions of said ring about tangential axes at said portions.

5. A piston and ring assembly, comprising: a piston having at least one peripheral groove, said groove having the walls thereof disposed on substantially conical surfaces coaxial with said piston; and ring means received in said groove, said ring means engaging said walls of said groove and being resiliently distorted thereby in a manner to rotate portions of said ring about tangential axes at said portions.

References Cited in the file of this patent

UNITED STATES PATENTS

| | | |
|---|---|---|
| 1,584,470 | Quintenz | May 11, 1926 |
| 1,919,183 | Paton | July 18, 1933 |
| 2,798,779 | Swartz et al. | July 9, 1957 |

FOREIGN PATENTS

| | | |
|---|---|---|
| 794,889 | Great Britain | May 14, 1958 |

OTHER REFERENCES

Automobile Engineer, January 1946, pages 29–31.